US007726522B2

(12) United States Patent
Greiner-Perth

(10) Patent No.: US 7,726,522 B2
(45) Date of Patent: Jun. 1, 2010

(54) DISPENSER FOR MEDIA

(75) Inventor: Juergen Greiner-Perth, Gottmadingen (DE)

(73) Assignee: Ing. Erich Pfeiffer GmbH, Radolfzell (DE)

( * ) Notice: Subject to any disclaimer, the term of this patent is extended or adjusted under 35 U.S.C. 154(b) by 1013 days.

(21) Appl. No.: 11/358,145

(22) Filed: Feb. 21, 2006

(65) Prior Publication Data

US 2006/0186141 A1 Aug. 24, 2006

(30) Foreign Application Priority Data

Feb. 22, 2005 (DE) ...................... 10 2005 009 296

(51) Int. Cl.
*G01F 11/00* (2006.01)

(52) U.S. Cl. ................ 222/321.6; 222/340; 222/153.09

(58) Field of Classification Search ............ 222/153.09, 222/321.1, 321.2, 321.6, 321.7, 340, 321.8, 222/189.09, 83.5, 89; 215/249
See application file for complete search history.

(56) References Cited

U.S. PATENT DOCUMENTS 4,365,729 A * 12/1982 Saito et al. ............... 222/321.2
4,369,900 A * 1/1983 Saito et al. ............... 222/321.2
4,624,393 A * 11/1986 Lopez ....................... 222/83.5
4,830,284 A * 5/1989 Maerte ....................... 239/333
4,930,999 A * 6/1990 Brunet et al. ............... 417/552
5,085,332 A * 2/1992 Gettig et al. ................ 215/249
5,772,080 A * 6/1998 de Pous et al. ........... 222/321.7
5,890,610 A * 4/1999 Jansen et al. ................ 215/253
5,938,084 A 8/1999 Fuchs et al.
6,059,150 A * 5/2000 Fuchs et al. .............. 222/321.2
7,201,296 B2 * 4/2007 Graf ........................ 222/321.9
7,367,478 B2 * 5/2008 Fuchs ......................... 222/341
2005/0127107 A1 * 6/2005 Mbonyumuhire et al. 222/383.1

FOREIGN PATENT DOCUMENTS

EP 0791399 A1 8/1997

* cited by examiner

*Primary Examiner*—Kevin P Shaver
*Assistant Examiner*—Jonathan Wood
(74) *Attorney, Agent, or Firm*—Flynn, Thiel, Boutell & Tanis, P.C.

(57) ABSTRACT

A dispenser for discharging media, particularly liquids, foams and pastes is proposed and whose dispenser casing is secured against dismantling. A securing section is provided which is engaged on the pump casing separately from a functional section. The securing section is connected by positive or frictional engagement with the functional section and in the joined state limits a first locking profiling provided on the functional section with regards to its elastic resilience, so that a second locking profiling provided on the pump casing and corresponding with the locking profiling of the functional section can no longer be overcome for dismantling purposes.

10 Claims, 5 Drawing Sheets

DISPENSER FOR MEDIA

CROSS REFERENCE TO RELATED APPLICATION

The following disclosure is based on German Patent Application No. 102005009296.9 filed on Feb. 22, 2005, which is herewith incorporated into this application by explicit reference.

FIELD OF THE INVENTION

The invention relates to a dispenser for media having a pump with an inside pump casing on which is displaceably guided coaxially to a pump longitudinal axis and in limited manner at least one hollow profile-shaped functional section, the displaceability in at least one direction being limited by axially mutually cooperating and mutually corresponding locking profilings, as well as to an assembly method for such a dispenser.

BACKGROUND OF THE INVENTION

Such dispensers are in particular used for liquids, suspensions, pastes and foams and are employed for the dosed discharge of said media. Preferably such dispensers are operated manually and in particular an applicator with a discharge opening guided coaxially to the pump casing can be displaced against the latter. This leads to a pump lift or stroke and consequently to the delivery of the medium, which is then discharged through the at least one discharge opening provided in the applicator. Such a dispenser is known from EP 791 399 A1.

The problem addressed by the invention is to provide a dispenser, which has increased security against a non-expert separation of coaxially displaceably guided pump components. A further problem addressed by the invention is to provide an assembly method for such a dispenser, which can be simply and operationally reliably implemented.

SUMMARY OF THE INVENTION

According to the invention this problem is solved by a dispenser for media having a pump with an inside pump casing on which is displaceably guided coaxially to a pump longitudinal axis and in limited manner at least one hollow profile-shaped functional section, the displaceability in at least one direction being limited by axially mutually cooperating and mutually corresponding locking profilings. In a first variant the at least one locking profiling of the functional section is provided with means bringing about a radial, elastic resilience and with the locking profiling of the functional section is associated a locking section radially facing the locking profiling associated with the pump casing and which is entrained with the functional section and engages in radially supporting manner on the locking profiling of the functional section. In a second variant the locking profiling associated with the pump casing is equipped with means which bring about a radial, elastic resilience and with the locking profiling associated with the pump casing is associated a locking section radially facing the locking profiling of the functional section and which engages in radially supporting manner on the locking profiling associated with the pump casing.

The pump casing, which forms a pump component, is, at least in a portion thereof, a hollow profile-shaped casing, which preferably receives a pump plunger or other pump elements such as springs, seals, packings, etc. The functional section and the pump casing preferably have a circular cross-section. However, and this is also covered by the invention, it is possible to have other hollow profile shapes such as e.g. hollow profiles with a polygonal cross-section. The pump casing is preferably firmly connected to a media reservoir, e.g. a glass or plastic bottle. The functional section can in particular be constructed integrally with an applicator terminating the dispenser on its upper side or can be firmly connected to the same. The applicator and functional section form at least one further pump component. The displaceability of the functional section on the pump casing coaxially to the pump longitudinal axis serves to provide the actual pumping process. Thus, displaceability is roughly limited to a distance corresponding to a pump lift or stroke. This is implemented at least in one displacement direction by locking profilings such as circumferential support shoulders, guide grooves or stop dogs or detents. The locking profilings essentially have axial supporting and/or stop functions for the pump components displaceable relative to one another.

In conjunction with the present description the pump longitudinal direction of the pump casing to the applicator is described as "top" or "upwards" and the opposite direction as "bottom" or "downwards".

In the first variant of the invention means are provided permitting a resilience of the functional section-side locking profiling. Such means can e.g. be in a specific geometry or a specific material composition, which in the vicinity of the locking profilings permit a radial deformation of the functional section. Depending on the design of the dispenser there is either a radial resilience towards or away from the pump longitudinal axis, depending on whether during the assembly the locking profiling of the functional section is deflected towards or away from the pump longitudinal axis. The securing section is to be provided in the radial direction starting from the locking profiling of the functional section in which there is an elastic bending or deformation of the locking profiling during assembly. If the locking profiling of the functional section gives way radially in the direction of the pump longitudinal axis during assembly, the securing section is to be provided on the inside in the functional section. However, if the locking profiling of the functional section is pressed radially outwards during assembly, then the securing section is provided outside the functional section. As a result of the securing section the elastic resilience of the locking profiling of the functional section necessary for removing the functional section from the pump casing is reduced or eliminated. Thus, a very high force and which may possibly damage the pump components is necessary to slide the locking profiling of the functional section secured by the securing section over the corresponding locking profiling associated with the pump casing. In addition, a bending moment acting on the functional section about a pump transverse action is scarcely suitable in the case of a locking profiling of the functional section secured in this way for releasing the functional section from the pump casing. The securing section is preferably also constructed as a hollow profile and is so designed that it is positively or non-positively connectable to the functional section. For a non-positive connection the transverse extension of the outer face of the inside securing section or the transverse extension of the inner face of the outside securing section is to be dimensioned in such a way that the securing section is engaged on the functional section or introduced into said functional section and forms a press fit with the latter. However, in the case of a positive connection a clearance or transition fit is sufficient, if additionally a locking profiling or the like is provided. During the operation of the pump the functional section and securing section are interconnected and are guided jointly on the pump casing in the pump longitudinal direction.

In the second variant the circumstances are similar to those of the first variant, but are modified in that the locking profiling associated with the pump casing, instead of the locking profiling of the functional section, has a radial, elastic resilience. Once again the elastic resilience can be brought about by an adapted geometry or material design. The locking profiling can either be directly part of the pump casing or can be firmly connected to the latter. As in the first variant a securing section is provided and is located on the inside or outside of the locking profiling associated with the pump casing, the securing section once again being provided on the side opposite to the locking profiling of the functional section. In the case of locking profilings which are pressed outwards during the assembly process, the securing section is provided in the form of an outside securing section and in the case of locking profilings which are pressed inwards during the assembly process the securing section is provided as an inside securing section. As in the first variant, the securing section prevents an elastic deformation of the pump casing-side locking profiling, so that it is made much more difficult to remove the functional section from the pump casing. Unlike in the first variant, the securing section is not entrained with the functional section and instead remains connected in stationary manner to the pump casing. The connection between pump casing and securing section is preferably provided in non-positive and/or positive form.

The dispenser according to the invention, in the case of the two variants according to the invention, is secured in constructionally simple manner against undesired disassembly.

According to a further development of the invention the locking profiling associated with the pump casing and/or the locking profiling of the functional section has an in particular circumferential, planar stop shoulder oriented radially to the pump longitudinal axis.

Thus, the stop shoulder is at least partly constructed in such a way that the pump longitudinal axis is perpendicular thereto. A planar stop shoulder oriented in this way constitutes a particularly good stop which reliably and in defined manner limits the pump lift. It is particularly advantageous that when the functional section strikes against the pump casing in the upper lift end position, as a result of this design of the stop faces only axial forces are transmitted, which reduces the risk of the locking profilings being radially deformed when the functional section strikes hard against the upper lift end position, because such a radial deformation would allow the functional section to slide off the pump casing. This makes it possible to achieve an improved dosing precision. Preferably the corresponding locking profilings, particularly the detents or support studs, are provided with correspondingly radially oriented support or stop faces so as to allow a reliable, axial supporting of the functional section on the pump casing.

According to a further development of the invention the locking profiling of the functional section or the locking profiling associated with the pump casing have detents, which are circumferentially mutually spaced by recesses serving as free cuts.

The free cuts are enclosed by the means for bringing about the radial, elastic resilience. Such detents permit a particularly marked, radial, elastic resilience and can be used with particular advantage if it is necessary to have a large stop face between the locking profilings of the functional section and the locking profilings associated with the pump casing. As a result of the recesses between the detents, it is ensured that a radial, elastic resilience does not lead to tangentially acting tensile stresses in the locking profiling. Such tensile stresses to a significant extent limit the elastic resilience and consequently prevent a use of locking profilings with a large, radial contact face.

According to a further development of the invention the functional section or securing section is constructed in one piece with an applicator having a discharge opening. This represents a particularly simple form of an inventive dispenser where only a few components are needed.

In a further development of the invention the securing section is constructed integrally with a finger support part. Also in this development it is particularly advantageous that only a few components are needed. On the finger support part is provided for this purpose a hollow body section pointing in the pump longitudinal direction and whose inside has a transverse extension equal to or slightly larger than the transverse extension of the outer face of the functional section. Apart from the constructional simplicity in the case of such an embodiment it is advantageous that the securing section is particularly stable against deformation, so that the dispenser is additionally secured against inexpert opening.

Apart from the dispenser for media, the invention also relates to an assembly method for a dispenser, particularly a dispenser in the first variant according to the invention. The assembly method more generally relates to dispensers with a pump casing and an applicator displaceable in a limited axial manner with respect to the pump casing in operation. In a first assembly step a hollow profile-shaped securing section is engaged on the pump casing and then in a second assembly step the applicator is mounted on the pump casing with the securing section, the securing section and applicator engaging with one another in such a way that the securing section and applicator are positively and/or non-positively interconnected and together prevent the applicator from being drawn off.

In the first assembly step the securing section is preferably displaced up to a pump casing-side stop on the pump casing. In the second assembly step the applicator is preferably once again moved up to a pump casing-side stop on the pump casing, said pump casing-side stop preferably simultaneously defining the lift end position in pump operation. During the engagement of the applicator the latter is connected to the securing section, so that in pump operation the applicator and securing section are jointly guided on the pump casing. As a result of this connection between the securing section and the applicator there is preferably a reduction in the resilience of one of the two parts following engagement necessary for the engagement of the securing section or applicator, so that the removal of the applicator from the pump casing requires a much greater force than the engagement on said pump casing. As a result of the method according to the invention a particularly simple plug assembly is made possible.

These and further features of preferred developments of the invention can be gathered from the claims, description and drawings and the individual features, both singly and in the form of subcombinations, can be implemented in embodiments of the invention and in other fields and can represent advantageous, independently protectable constructions for which protection is claimed here.

BRIEF DESCRIPTION OF THE DRAWINGS

Preferred embodiments of the invention are described hereinafter relative to the diagrammatic drawings, wherein show.

DETAILED DESCRIPTION

Figure 1A:
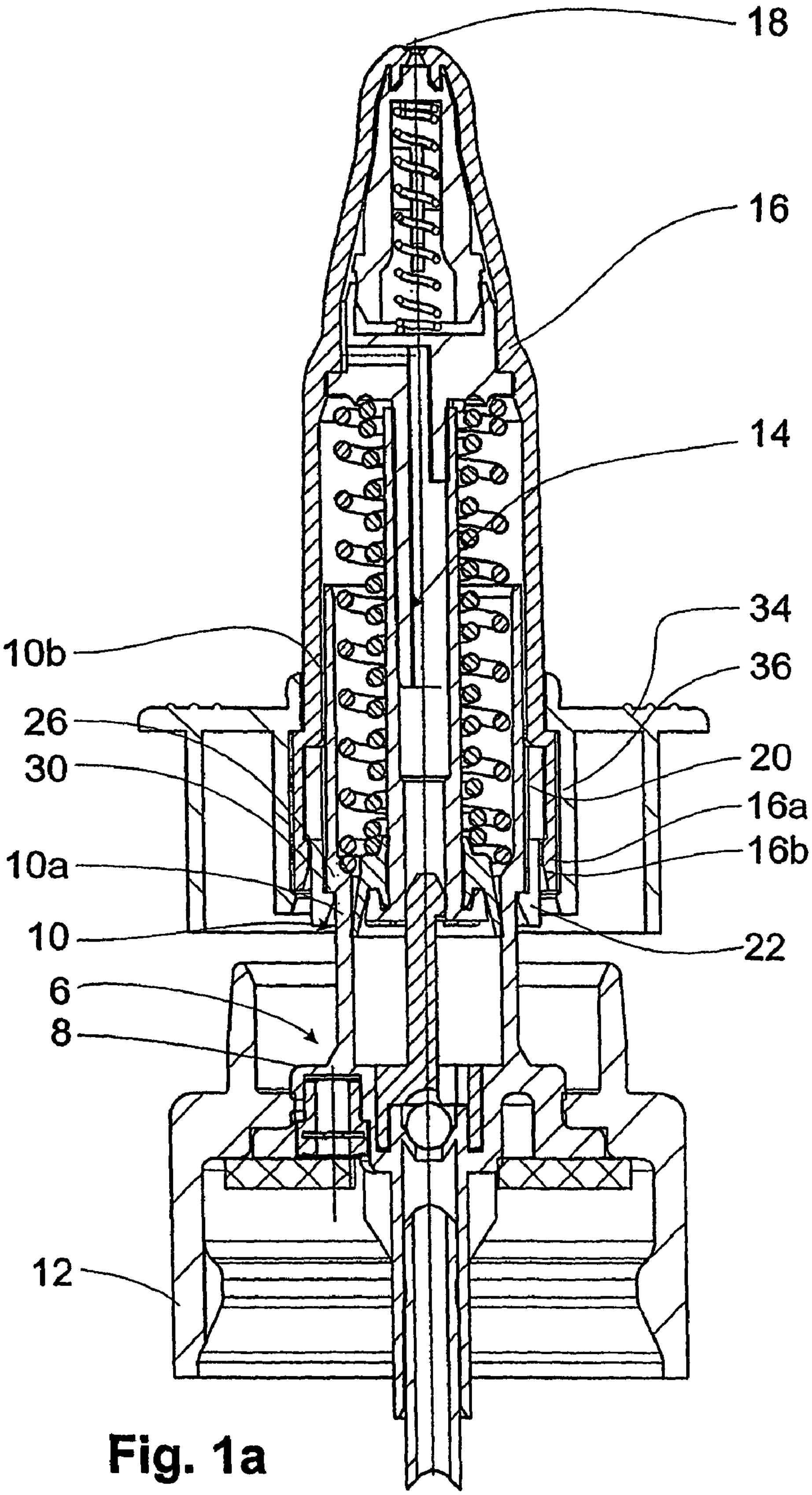
FIG. 1*a* & FIG. 1*b* A dispenser for media according to the invention having a pump in a first embodiment, FIG. 1*a* showing the dispenser in the upper lift end position and FIG. 1*b* in the lower lift end position.
Figure 1B:
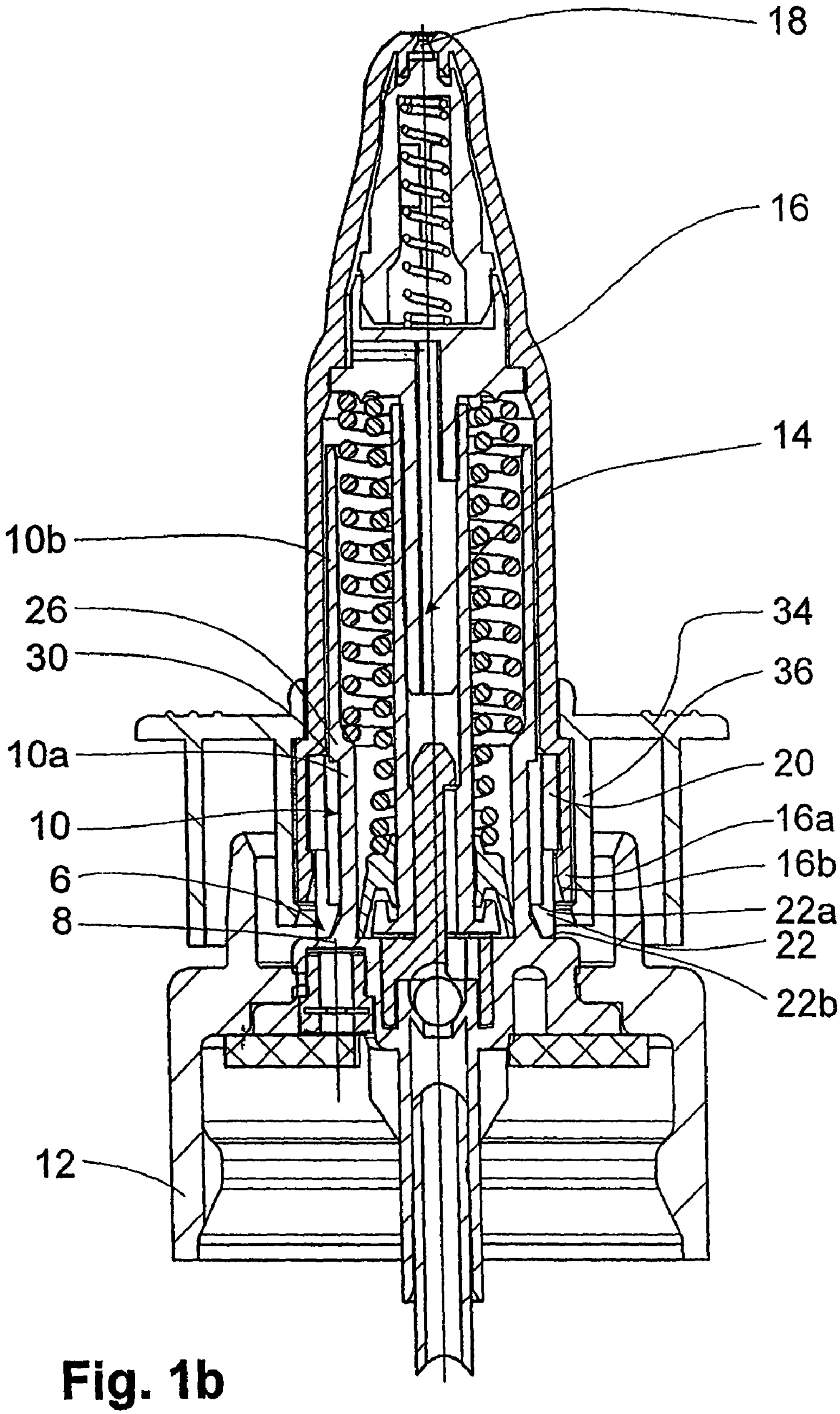
Figures 3A, 3B, 3C, 3D, 3E:
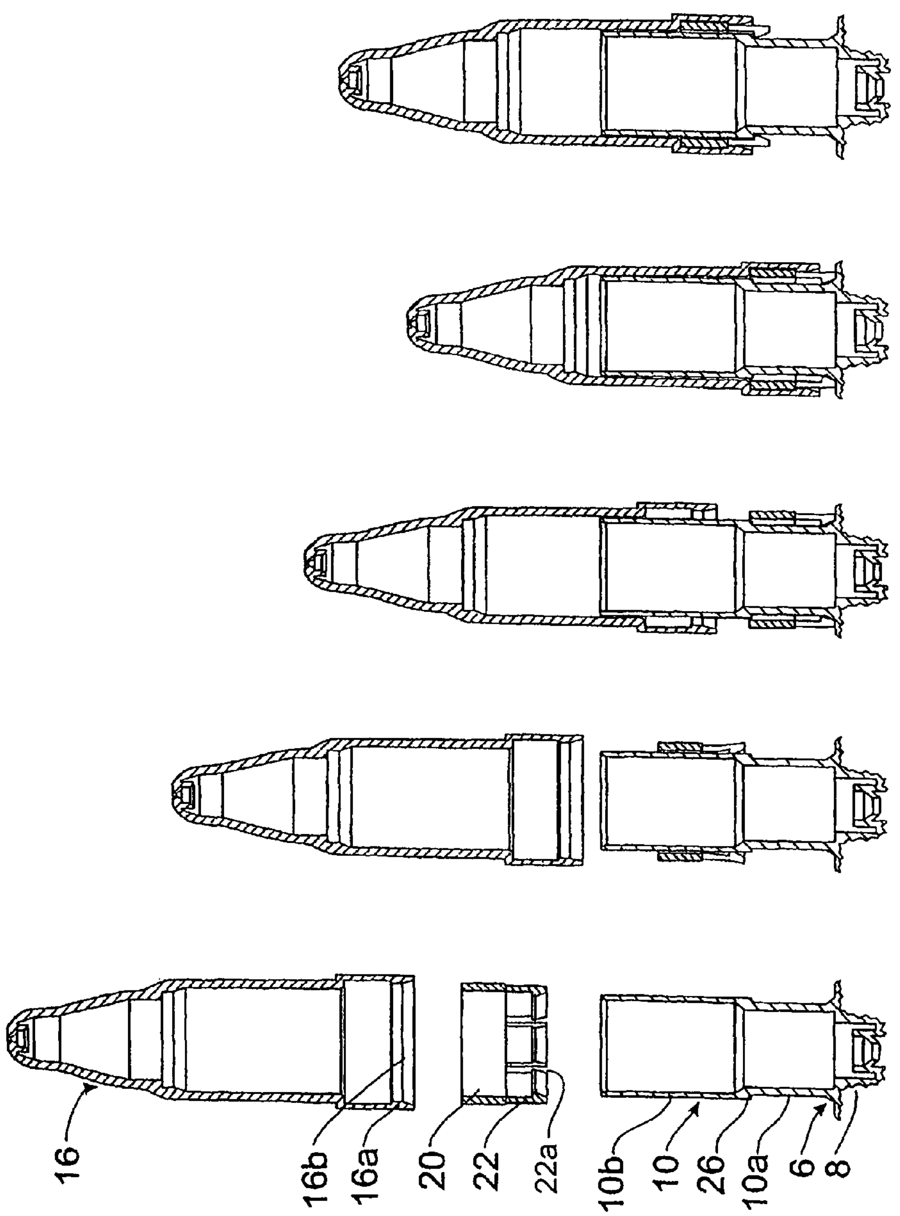
FIG. 3 The assembly sequence for the dispenser shown in FIG. 1.

FIGS. 1*a* and 1*b* show a first embodiment of a dispenser according to the invention. The dispenser has a substantially rotationally symmetrical pump casing 6 comprising a casing base 8 and a cylindrical section 10. The pump casing 6 is connected to a closure 12 for mounting on a media container. In an inner area 14 of the pump casing 6 are provided a series of pump components used for delivering the medium contained in the not shown media container. Onto the cylindrical section 10 of the pump casing 6 is mounted an applicator 16 provided on its upper side with a discharge opening 18. The applicator 16 is connected by means of an applicator-side locking profiling 16*b* with a functional section 20 by which the applicator is connected to the pump casing 6 in such a way that it is axially displaceable between the upper lift end position shown in FIG. 1*a* and the lower lift end position shown in FIG. 1*b*. To this end the functional section 20 has six detents 22 which extend radially inwards. Each pair of circumferentially-adjacent detents are separated from one another by an axially-extending cut 22*a* (FIG. 3*a*). In the assembled state shown in FIGS. 1*a* and 1*b* the functional section 20 has been engaged on the cylindrical section of the pump casing 6 to such an extent that the detents 22 of the functional section 20 engage in a first segment 10*a* of the cylindrical section 10 with a diameter reduced compared with the second segment 10*b* positioned above the same. In not shown embodiments it is possible to have other types of locking profilings such as circumferential annular areas, circumferentially separated annular segments and the like.

In the transition area between the first segment 10*a* and the second segment 10*b* of the cylindrical section 10 is provided an annular shoulder 26 defining the upper lift end positions of the pump. The annular shoulder 26 has a circumferential stop face 30 oriented parallel to the pump transverse direction. The detents 22 have an upwardly directed, first functional face 22*a* corresponding to the stop face 30 and which in the upper lift end position engage flat on the stop face 30. On the side opposite to the first functional face 22*a* the detents 22 have a downwardly directed second functional face 22*b* engaging flat on the casing base 8 in a lower lift end position. Thus, as a result of the shaping of the detents 22 the lift of the dispenser shown can be fixed both with respect to its upper and its lower lift end position. In the embodiment shown the applicator 16 is intended for nasal application.

If as a result of the use of force or tilting the locking profiling 16*b* of the securing section 16 of the applicator slides over the shoulder of the functional section 20 corresponding to the locking profiling 16*b*, during the subsequent pumping process and after the functional faces 22*b* of the detents 22 strike against the casing base, it is moved back again into the desired position.

To prevent an overcoming of this stop face 30 by the functional section 20, the lower end 16*a* of applicator 16 is constructed as a securing section. Said securing section 16*a* extends axially over and beyond the detents 22 and in this way prevents elastic deflection of the detents 22. An axial drawing off of the axially movable subassembly with the applicator 16 and functional section 20 is prevented as a result of this. Onto the applicator 16 is additionally axially engaged a finger support 34, which on the one hand permits the comfortable pressing down of the applicator 16 and the associated pumping action and on the other, as a result of a cylindrical section 36, provides security for the securing section 16*a* and locking profiling 16*b*. In a not shown embodiment there is a press or transition fit between the securing section 16*a* and cylindrical section 36 of finger support 34 in order to effectively prevent the drawing off of the securing section 16*a* of applicator 16.

Figure 2:
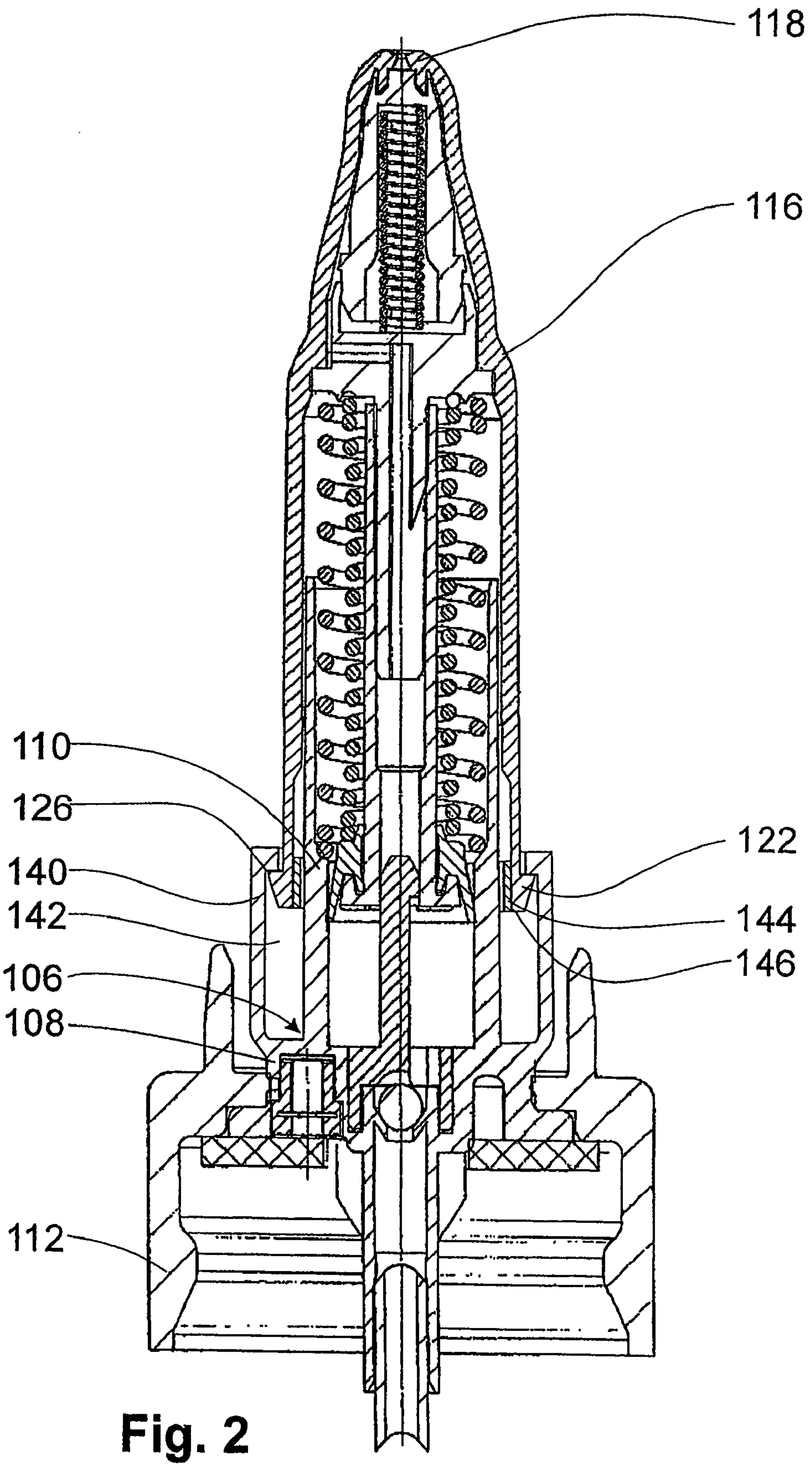
FIG. 2 A diagrammatic representation of a second embodiment of a dispenser according to the invention in the upper lift end position.
Figures 4A, 4B, 4C, 4D, 4E:
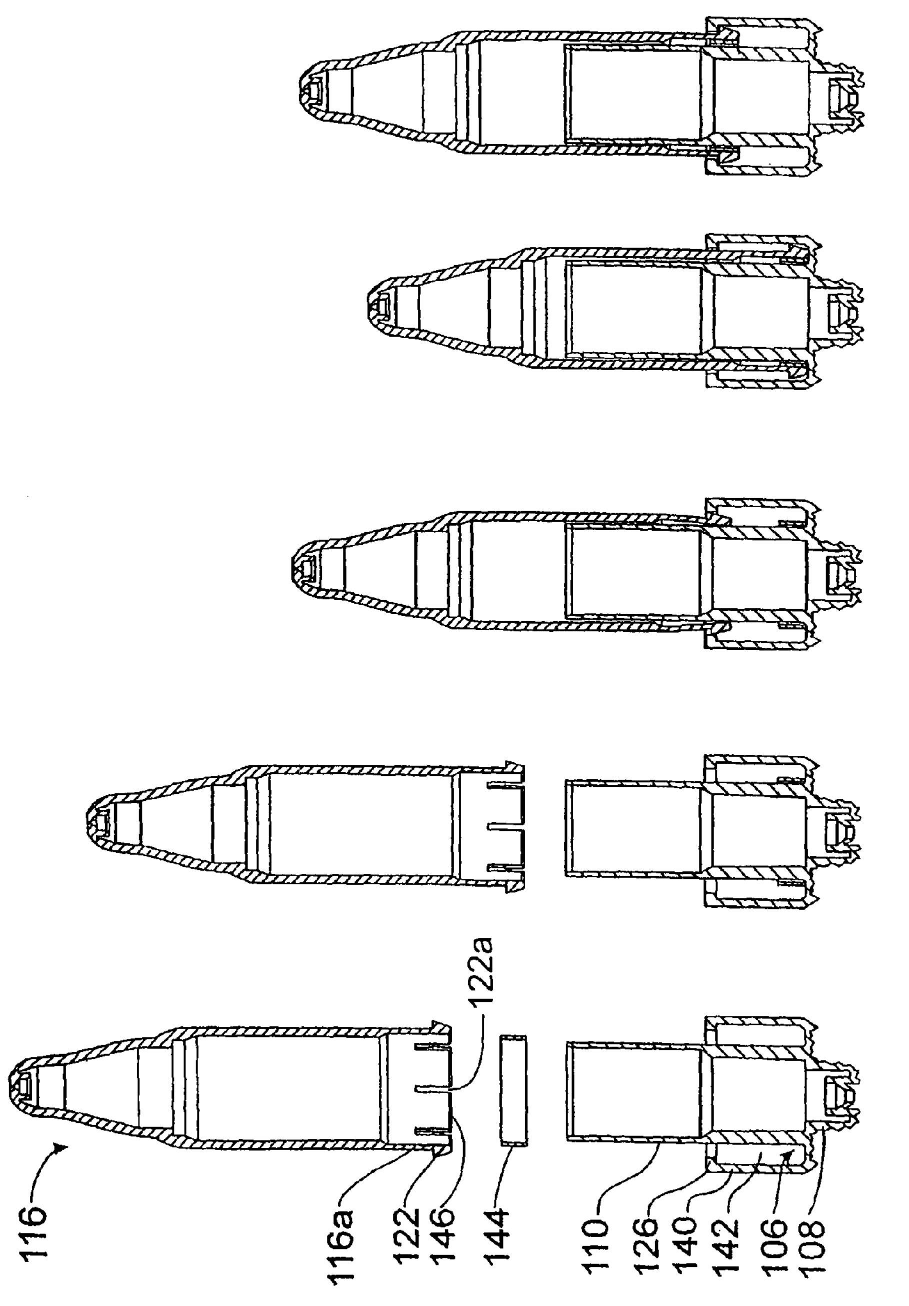
FIG. 4 The assembly sequence for the dispenser shown in FIG. 2.

FIG. 2 shows a second embodiment of the media dispenser according to the invention. As in the case of the dispenser shown in FIGS. 1*a* and 1*b*, it has a pump casing 106 onto which is engaged an applicator 116 with a discharge opening 118. On the applicator 116 are provided at the lower end detents 122 integrally connected to said applicator and which extend radially outwards. Adjacent pairs of detents 122 are separated from one another by a cut 122*a* (FIG. 4*a*). The locking profiling on the side of the pump casing 106 corresponding to the detents 122 is constituted by a circumferential annular shoulder 126 at the upper end of a cylindrical auxiliary web 140 extending axially upwards from a casing base 108. The cylindrical section 110 of the pump casing 106 together with the auxiliary web 140 forms a circumferential, one-sided axially open chamber 142 into which project the detents 122 of applicator 116. Within the chamber 142 the detents 122 are engaged on a cylindrical Securing section 144 having an external diameter slightly larger than the internal diameter of applicator 116 in the vicinity of detents 122. As a result of the securing section 144, the detents 122 within the chamber 142 are pressed outwards, so that it is impossible to draw the applicator 116 from the pump casing 106 past annular shoulder 126. As compared with the embodiment of FIGS. 1*a* and 1*b*, that shown in FIG. 2 more particularly differs in that disassembly of the dispenser without causing destruction of same is virtually impossible.

FIGS. 3*a* to 3*e* show different stages in the plug assembly of a media dispenser corresponding to the first embodiment of an inventive dispenser shown in FIGS. 1*a* and 1*b*. To simplify representation, components of the dispenser not essential for illustrating the invention are not shown.

FIG. 3*a* shows the components of the first embodiment of the inventive dispenser essential to the invention. They are constituted by applicator 16, functional section 20 and pump casing 6, comprising casing base 8 and cylindrical section 10.

As shown in FIG. 3*b*, in a first step the functional section 10 is engaged over a second segment 10*b* having a larger external diameter than a first segment 10*a* connecting below the same. The detents 22 of functional section 20 are pressed elastically outwards and in the first, smaller external diameter segment 10*a*, spring back into their original, relaxed position. In the embodiment shown, the stop faces of detents 22 are at right angles to the pump longitudinal axis. In not shown embodiments angles of more than 90ø are implemented in order to bring about an additional positive engagement in the radial direction.

As can be seen in FIG. 3*c*, the applicator 16 is subsequently engaged over the pump casing 6 and initially no significant force is required, because there is no elastic deformation of the pump casing 20 or applicator 16. The applicator 16 is then engaged over the functional section 20 which involves an increased force expenditure, because at the lower end 16*a* of applicator 16 a locking profiling 16*b* is provided, which has a smaller internal diameter than the external diameter of the functional section 20.

As can be seen in FIG. 3*d*, the applicator 16 is engaged over the functional section 20 to such an extent that the locking profiling at the end 16*a* of applicator 16 engages in the vicinity of detents 22 of functional section 20. The assembly of applicator 16, functional section 20 and pump casing 10 is consequently at an end. As a result of the end 16*a* of applicator 16 engaging on detents 22 of functional section 20, only a limited deflection of the detents 22 is possible. This ensures that the detents 22 cannot be slid away via the stop face 30 on annular shoulder 26 between the segment 10*a* with a smaller external diameter than segment 10*b*. A dismantling of the dispenser is only possible by first removing the applicator 16 from functional section 20, the latter being drawn down from the pump casing, accompanied by a possible deflection of the detents 22. FIGS. 3*d* and 3*e* show the pump stroke or lift possible during correct operation. This is upwardly limited by the striking of the detents against stop face 30 of annular shoulder 26.

FIGS. 4*a* to 4*e* show the assembly sequence for the embodiment of a dispenser according to the invention shown in FIG. 2 and once again only the dispenser components essential to the invention are shown.

This second embodiment of an inventive dispenser has, as can be seen in FIG. 4*a*, an applicator 116, a securing section 144 and a pump casing 106 comprising a casing base 108, a cylindrical section 110 and a cylindrical auxiliary web 140 emanating from the casing base 108.

In a first working step shown in FIG. 4*b*, the securing section 144 is engaged over the cylindrical section 110 of pump casing 106. No force expenditure is required for this purpose, because the internal diameter of securing section 144 is larger than the external diameter of cylindrical section 110. The securing section 114 is moved into the axially open chamber 142 formed by cylindrical auxiliary web 144 and cylindrical section 110 of pump casing 106.

As can be seen in FIG. 4*c*, the applicator 116 is then engaged on the pump casing 106 and the outwardly directed detents 122 on annular shoulder 126 provided at the lower end of applicator 116 and which upwardly bound the cylindrical auxiliary web 140 are pressed radially inwards. If the detents 122 on annular shoulder 126 are moved past the circumferential chamber 142, they jump back again into their undeflected starting position.

As shown in FIG. 4*d*, the applicator 116 is then moved further into the circumferential chamber 142 and over the final portion before the detents 122 strike against the casing base 108, the applicator 116 is engaged over the securing section 144. An increased force is necessary for this, because the external diameter of the securing section 144 is larger than the internal diameter of applicator 116 in the vicinity of detents 122. However, so as to still make it possible to engage over, on the insides of detents 122 are provided chamfers 146. When the applicator 116 has completely engaged over the functional section 144 and strikes against the casing base 108 the assembly process is at an end.

As can be seen in FIG. 4*e*, as a result of the external diameter of securing section 144 being larger than the internal diameter of applicator 116 in the vicinity of detents 122, it is ensured that there is a frictional engagement between securing section 144 and applicator 116. Thus, even during the lift movement shown in FIG. 4*e*, the applicator 116 and securing section 114 remain interconnected. The applicator 116 can no longer be extracted from the circumferential chamber 142 of pump casing 106, because a radial pressing in of the detents 122 is prevented by the securing section 144. Due to the poor accessibility of the securing section 144 it is only possible with great difficulty to again release the non-positive connection between applicator 116 and securing section 144. Thus, with the dispenser according to the second embodiment it is ensured that disassembly is rendered virtually impossible without expending brute force.

The invention claimed is:

1. Dispenser for media having a pump provided with an inside pump casing on which is displaceably guided coaxially to a pump longitudinal axis in a limited manner at least one hollow profile-shaped functional section to provide the pumping process, the displaceability of the functional section in at least one direction being limited by mutually corresponding locking profilings which are associated with the pump casing and the functional section, respectively, wherein at least the locking profiling of the functional section is provided with detents which are circumferentially mutually spaced from one another by recesses serving as free cuts, said detents bringing about a radial, elastic resilience, a securing section radially facing the locking profiling associated with the pump casing is associated with the locking profiling of the functional section and said securing section is entrained with the functional section so that during operation of the pump the functional section and the securing section are interconnected and are guided jointly on the inside pump casing along the pump longitudinal axis and said securing section engages in a radially supporting manner on the locking profiling of the functional section, the securing section and the functional section being configured relative to each other such that the functional section and the pump casing can be assembled by deflecting the detents only before the functional section and the securing section are interconnected, and the functional section and the pump casing cannot be disassembled once the functional section and the securing section are interconnected as the securing section is disposed to prevent deflection of the detents.

2. Dispenser according to claim 1, wherein the locking profiling associated with the pump casing or the locking profiling of the functional section defines a stop shoulder oriented radially to the pump longitudinal axis.

3. Dispenser according to claim 1, wherein the securing section is constructed integrally with an applicator having at least one discharge opening.

4. Dispenser according to claim 1, wherein the securing section is constructed integrally with a finger support part.

5. A dispenser for media comprising:

a pump including a pump casing configured for connection to a media container and defining a longitudinal pump axis, said pump casing defining a locking member thereon;

a functional section mounted on said pump casing so as to be displaceable relative to said pump casing in the direction of the pump axis to provide a pumping action, said functional section defining thereon a locking member which cooperates with said locking member of said pump casing to limit the displacement of said functional section in at least one direction of movement in the direction of the pump axis, said locking member of said functional section defining a plurality of radially-deflectable detents, each adjacent pair of said detents being separated from one another by a cut defined in said functional section to provide said functional section with radial resiliency; and a securing section radially facing said locking member of said pump casing and being interconnected with said functional section during operation of said pump such that said securing section and said functional section are together displaceable along and relative to said pump casing in the direction of the pump axis, said securing section being disposed in an axially overlapping manner with said locking member of said functional section and limiting radial deflection of said detents of said functional section so as to prevent disassembly of said dispenser.

6. The dispenser of claim 5, wherein said pump casing includes a base, a cylindrical section extending axially upwardly from said base, and a cylindrical web extending axially upwardly from said base and spaced radially outwardly from said cylindrical section, said cylindrical web having an upper end defining thereon an annular shoulder which defines said locking member of said pump casing, said detents being disposed radially between said cylindrical section and said cylindrical web.

7. The dispenser of claim 6 further including an applicator defining a discharge opening therein, wherein said functional section is formed integrally with, and defines a lower extent of, said applicator, and said securing section is a cylindrical member disposed in surrounding relation with said cylindrical section of said pump casing and radially between said cylindrical section and said detents, said cylindrical member being configured to press said detents radially outwardly so as to prevent movement of said detents axially upwardly beyond said annular shoulder thus preventing separation of said functional section and said applicator from said pump casing.

8. The dispenser of claim 5, wherein said securing section is a cylindrical member disposed in surrounding relation with a portion of said pump casing.

9. The dispenser of claim 5, wherein said pump casing includes a base and a cylindrical section extending axially upwardly from said base, said cylindrical section having a first portion with a first diameter and a second portion with a second diameter greater than the diameter of said first portion, and a radially-oriented shoulder defined at a junction between said first and second portions, said detents extending radially inwardly and engaging said first portion.

10. The dispenser of claim 9, further including an applicator defining a discharge opening therein, wherein said securing section is integrally formed with said applicator and defines a lower end thereof, and said functional section is disposed radially between said securing section and said cylindrical section of said pump casing, said securing section being disposed in both surrounding, and in axially overlapping relation with, said functional section to minimize outward radial deflection of said detents so as to prevent movement of said detents axially upwardly beyond said shoulder thus preventing separation of said applicator and said functional section from said pump casing.

* * * * *